United States Patent
Hu et al.

(10) Patent No.: US 8,762,357 B2
(45) Date of Patent: *Jun. 24, 2014

(54) ENTERPRISE SECURITY MANAGEMENT SYSTEM USING HIERARCHICAL ORGANIZATION AND MULTIPLE OWNERSHIP STRUCTURE

(75) Inventors: Limin Hu, Fremont, CA (US); Ting-Hu Wu, Fremont, CA (US); Ching-Chih Jason Han, Fremont, CA (US)

(73) Assignee: Ellie Mae. Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,472

(22) Filed: Feb. 27, 2012

(65) Prior Publication Data
US 2012/0158787 A1    Jun. 21, 2012

Related U.S. Application Data

(63) Continuation of application No. 10/991,829, filed on Nov. 18, 2004, now Pat. No. 8,126,920, which is a continuation-in-part of application No. 10/884,766, filed on Jul. 2, 2004.

(51) Int. Cl.
*G06F 17/30* (2006.01)

(52) U.S. Cl.
USPC .......................................... 707/705; 707/778

(58) Field of Classification Search
USPC .................................. 707/705, 778
See application file for complete search history.

(56) References Cited

U.S. PATENT DOCUMENTS

| | | |
|---|---|---|
| 5,091,868 A | 2/1992 | Pickens et al. |
| 5,111,185 A | 5/1992 | Kozaki |
| 5,144,693 A | 9/1992 | Morgan |
| 5,148,520 A | 9/1992 | Morgan |
| 5,191,525 A | 3/1993 | LeBrun et al. |
| 5,226,137 A | 7/1993 | Bolan et al. |
| 5,438,657 A | 8/1995 | Nakatani |
| 5,581,700 A | 12/1996 | Witte |
| 5,611,052 A | 3/1997 | Dykstra et al. |
| 5,699,527 A | 12/1997 | Davidson |

(Continued)

FOREIGN PATENT DOCUMENTS

WO    WO 00/21011    4/2000

OTHER PUBLICATIONS

Contour Software, Inc.—The Loan Closer for Windows—Version 4.0 (1984-1998).
Contour Software, Inc.—The Loan Handler—Version 5.0 (1984-2001).

(Continued)

*Primary Examiner* — Kim Nguyen
(74) *Attorney, Agent, or Firm* — Fish & Richardson P.C.

(57) ABSTRACT

A hierarchical security model for networked computer users is described. Files and resources are controlled or created by users within the network. Each user within the network has an account that is managed by a network administrator. The account specifies the user identifier and password. Users are grouped into organizations depending upon function or other organizational parameter. The groups within the network are organized hierarchically in terms of access and control privileges. Users within a higher level group may exercise access and control privileges over files or resources owned by users in a lower level group. The account for each user further specifies the group that the owner belongs to and an identifier for any higher level groups that have access privileges over the user's group. All users within a group inherit the rights and restrictions of the group.

19 Claims, 8 Drawing Sheets

| | GROUP ID | GROUP DESCRIPTION | PARENT GROUP |
|---|---|---|---|
| GROUP 0 | G0 | HQ | |
| GROUP 1 | G1 | WEST | G0 |
| GROUP 2 | G2 | EAST | G0 |
| GROUP 11 | G11 | SOUTHWEST | G1 |
| GROUP 12 | G12 | NORTHWEST | G1 |
| GROUP 23 | G23 | SOUTHWEST | G2 |

(56) References Cited

U.S. PATENT DOCUMENTS

| | | | |
|---|---|---|---|
| 5,704,029 A | 12/1997 | Wright, Jr. | |
| 5,734,898 A | 3/1998 | He | |
| 5,752,042 A | 5/1998 | Cole et al. | |
| 5,765,144 A | 6/1998 | Larche et al. | |
| 5,768,510 A | 6/1998 | Gish | |
| 5,774,551 A | 6/1998 | Wu et al. | |
| 5,812,764 A | 9/1998 | Heinz, Sr. | |
| 5,913,029 A | 6/1999 | Shostak | |
| 5,919,247 A | 7/1999 | Van Hoff et al. | |
| 5,940,812 A | 8/1999 | Tengel et al. | |
| 5,963,952 A | 10/1999 | Smith | |
| 5,995,947 A | 11/1999 | Fraser et al. | |
| 5,995,985 A | 11/1999 | Cai | |
| 6,000,033 A | 12/1999 | Kelley et al. | |
| 6,006,242 A | 12/1999 | Poole et al. | |
| 6,006,334 A | 12/1999 | Nguyen et al. | |
| 6,023,714 A | 2/2000 | Hill et al. | |
| 6,029,149 A | 2/2000 | Dykstra et al. | |
| 6,078,403 A | 6/2000 | Palmer | |
| 6,081,893 A | 6/2000 | Grawrock et al. | |
| 6,088,700 A | 7/2000 | Larsen et al. | |
| 6,088,796 A | 7/2000 | Cianfrocca et al. | |
| 6,092,121 A | 7/2000 | Bennett et al. | |
| 6,101,510 A | 8/2000 | Stone et al. | |
| 6,104,394 A | 8/2000 | Lisle et al. | |
| 6,128,602 A | 10/2000 | Northington et al. | |
| 6,154,751 A | 11/2000 | Ault et al. | |
| 6,157,953 A | 12/2000 | Chang et al. | |
| 6,175,926 B1 | 1/2001 | Fogle | |
| 6,202,206 B1 | 3/2001 | Dean et al. | |
| 6,208,979 B1 | 3/2001 | Sinclair | |
| 6,209,095 B1 | 3/2001 | Anderson et al. | |
| 6,226,623 B1 | 5/2001 | Schein et al. | |
| 6,233,566 B1 | 5/2001 | Levine et al. | |
| 6,233,582 B1 | 5/2001 | Traversat et al. | |
| 6,266,716 B1 | 7/2001 | Wilson et al. | |
| 6,282,658 B2 | 8/2001 | French et al. | |
| 6,321,339 B1 | 11/2001 | French et al. | |
| 6,324,524 B1 | 11/2001 | Lent et al. | |
| 6,324,648 B1 | 11/2001 | Grantges, Jr. | |
| 6,336,124 B1 | 1/2002 | Alam et al. | |
| 6,338,064 B1 | 1/2002 | Ault et al. | |
| 6,339,828 B1 | 1/2002 | Grawrock et al. | |
| 6,341,351 B1 | 1/2002 | Muralidhran et al. | |
| 6,351,776 B1 | 2/2002 | O'Brien et al. | |
| 6,363,391 B1 | 3/2002 | Rosensteel, Jr. | |
| 6,366,912 B1 | 4/2002 | Wallent et al. | |
| 6,385,655 B1 | 5/2002 | Smith et al. | |
| 6,397,337 B1 | 5/2002 | Garrett et al. | |
| 6,418,448 B1 | 7/2002 | Sarkar | |
| 6,424,968 B1 | 7/2002 | Broster et al. | |
| 6,438,526 B1 | 8/2002 | Dykes et al. | |
| 6,446,141 B1 | 9/2002 | Nolan et al. | |
| 6,469,714 B2 | 10/2002 | Buxton et al. | |
| 6,473,892 B1 | 10/2002 | Porter | |
| 6,476,828 B1 | 11/2002 | Burket et al. | |
| 6,476,833 B1 | 11/2002 | Moshfeghi | |
| 6,477,537 B2 | 11/2002 | Gustman | |
| 6,493,871 B1 | 12/2002 | McGuire et al. | |
| 6,496,936 B1 | 12/2002 | French et al. | |
| 6,504,554 B1 | 1/2003 | Stone et al. | |
| 6,538,669 B1 | 3/2003 | Lagueux, Jr. et al. | |
| 6,553,408 B1 | 4/2003 | Merrell et al. | |
| 6,608,634 B1 | 8/2003 | Sherrard et al. | |
| 6,611,816 B2 | 8/2003 | Lebda et al. | |
| 6,615,405 B1 | 9/2003 | Goldman et al. | |
| 6,640,278 B1 | 10/2003 | Nolan et al. | |
| 6,662,340 B2 | 12/2003 | Rawat et al. | |
| 6,851,087 B1 | 2/2005 | Sibert | |
| 6,859,878 B1 | 2/2005 | Kerr et al. | |
| 6,904,412 B1 | 6/2005 | Broadbent et al. | |
| 6,920,434 B1 | 7/2005 | Cossette | |
| 6,947,943 B2 | 9/2005 | DeAnna et al. | |
| 7,058,971 B1 | 6/2006 | Horikiri | |
| 7,103,650 B1 | 9/2006 | Vetrivelkumaran et al. | |
| 7,155,490 B1 | 12/2006 | Malmer et al. | |
| 7,165,250 B2 | 1/2007 | Lyons | |
| 7,185,333 B1 | 2/2007 | Shafron | |
| 7,263,663 B2 | 8/2007 | Ballard et al. | |
| 7,340,714 B2 | 3/2008 | Upton | |
| 7,343,348 B2 | 3/2008 | McAvoy et al. | |
| 7,379,965 B2 | 5/2008 | Sherwood et al. | |
| 7,404,203 B2 * | 7/2008 | Ng | 726/6 |
| 7,444,302 B2 | 10/2008 | Hu et al. | |
| 7,461,395 B2 * | 12/2008 | Ng | 726/1 |
| 7,472,089 B2 | 12/2008 | Hu et al. | |
| 7,788,489 B2 * | 8/2010 | Ng | 713/167 |
| 8,019,881 B2 * | 9/2011 | Sandhu et al. | 709/229 |
| 8,117,117 B2 | 2/2012 | Hu et al. | |
| 8,126,920 B2 | 2/2012 | Hu et al. | |
| 8,364,579 B2 | 1/2013 | Hu et al. | |
| 8,510,818 B2 * | 8/2013 | Garg et al. | 726/9 |
| 8,600,798 B1 | 12/2013 | Corr et al. | |
| 8,612,590 B1 * | 12/2013 | Chaddha et al. | 709/225 |
| 2001/0010046 A1 | 7/2001 | Muyres et al. | |
| 2001/0011246 A1 | 8/2001 | Tammaro | |
| 2001/0029482 A1 | 10/2001 | Tealdi et al. | |
| 2001/0032178 A1 | 10/2001 | Adams et al. | |
| 2001/0037288 A1 | 11/2001 | Bennett et al. | |
| 2001/0039516 A1 | 11/2001 | Bennett et al. | |
| 2001/0047307 A1 | 11/2001 | Bennett et al. | |
| 2001/0047326 A1 | 11/2001 | Broadbent et al. | |
| 2001/0049653 A1 | 12/2001 | Sheets | |
| 2002/0019804 A1 | 2/2002 | Sutton | |
| 2002/0029188 A1 | 3/2002 | Schmid | |
| 2002/0059137 A1 | 5/2002 | Freeman et al. | |
| 2002/0065879 A1 | 5/2002 | Ambrose et al. | |
| 2002/0138414 A1 | 9/2002 | Baker, IV | |
| 2002/0188941 A1 | 12/2002 | Cicciarelli et al. | |
| 2002/0194219 A1 | 12/2002 | Bradley et al. | |
| 2003/0033241 A1 | 2/2003 | Harari | |
| 2003/0046586 A1 | 3/2003 | Bheemarasetti et al. | |
| 2003/0061398 A1 | 3/2003 | Wilson et al. | |
| 2003/0065614 A1 | 4/2003 | Sweeney | |
| 2003/0066065 A1 | 4/2003 | Larkin | |
| 2003/0159136 A1 | 8/2003 | Huang et al. | |
| 2003/0163598 A1 | 8/2003 | Wilson et al. | |
| 2003/0184585 A1 | 10/2003 | Xu | |
| 2003/0210428 A1 | 11/2003 | Bevlin et al. | |
| 2003/0220879 A1 | 11/2003 | Gaughan et al. | |
| 2003/0229581 A1 | 12/2003 | Green et al. | |
| 2003/0233316 A1 | 12/2003 | Hu et al. | |
| 2004/0019558 A1 | 1/2004 | McDonald et al. | |
| 2004/0034592 A1 | 2/2004 | Hu et al. | |
| 2004/0088700 A1 | 5/2004 | Lee et al. | |
| 2004/0138996 A1 | 7/2004 | Bettenburg et al. | |
| 2004/0158746 A1 | 8/2004 | Hu et al. | |
| 2004/0225596 A1 | 11/2004 | Kemper et al. | |
| 2004/0250120 A1 * | 12/2004 | Ng | 713/201 |
| 2005/0172271 A1 | 8/2005 | Spertus et al. | |
| 2005/0187937 A1 * | 8/2005 | Kawabe et al. | 707/9 |
| 2005/0208461 A1 | 9/2005 | Krebs et al. | |
| 2005/0235202 A1 | 10/2005 | Chen et al. | |
| 2005/0278249 A1 | 12/2005 | Jones et al. | |
| 2005/0289046 A1 | 12/2005 | Conyack, Jr. | |
| 2006/0004651 A1 | 1/2006 | Corr et al. | |
| 2006/0005036 A1 | 1/2006 | Hu et al. | |
| 2006/0059422 A1 | 3/2006 | Wu et al. | |
| 2006/0069753 A1 | 3/2006 | Hu et al. | |
| 2006/0075070 A1 | 4/2006 | Merissert-Coffinieres et al. | |
| 2006/0101023 A1 | 5/2006 | Han et al. | |
| 2006/0101453 A1 | 5/2006 | Burkhart et al. | |
| 2006/0155639 A1 | 7/2006 | Lynch et al. | |
| 2006/0178983 A1 | 8/2006 | Nice et al. | |
| 2006/0184452 A1 | 8/2006 | Barnes et al. | |
| 2006/0248003 A1 | 11/2006 | Basin et al. | |
| 2009/0055309 A1 | 2/2009 | Hu et al. | |
| 2011/0231907 A1 * | 9/2011 | Smith | 726/4 |
| 2012/0143748 A1 | 6/2012 | Hu et al. | |
| 2013/0179328 A1 | 7/2013 | Hu et al. | |

OTHER PUBLICATIONS

Ilium Software eWallet Users Guide and Reference Version 4.0 by Ilium Software, Inc. © 1997-2006.

(56) References Cited

OTHER PUBLICATIONS

Calyx Software, "Point for Windows Version 3.x Interface Development Guide," Nov. 29, 1999, pp. 1-21.
Calyx Software, "Point for Windows Version 3.x Interface Marketing Guide," Dec. 8, 1999, pp. 1-5.
LOS Documentation—Genesis (2001).
LOS Documentation—Calyx (Revised Aug. 2002).
Calyx Point—Getting Started (2002).
Calyx Point—Point User Guide (Revised May 2002).
LOS Documentation—Byte (2003).
Calyx Point—Point User Guide (Revised Oct. 2003).
Calyx Point and PointMan—Getting Started (Updated May 2003).
Calyx Point and PointMan—Getting Started (Updated Oct. 2003).
LOS Documentation—Genesis (2003) [changed from "2004" (typo)].
Understanding Client-Server Applications, Parts I and II, zone.ni.com, Feb. 19, 2004.
A Gentle Introduction to SGML, isgmlug.org, Apr. 14, 2004.
Overview of SGML Resources, W3.org., Apr. 14, 2004.
Application Service Provider, Webopedia, May 6, 2004.
How ASPs Work, howstuffworks.com, Jul. 1, 2004.
Defining an Internet ASP, howstuffworks.com, Jul. 1, 2004.
Examples of ASPs, howstuffworks.com, Jul. 1, 2004.
How ASPs Work, Things to Ask a Prospective ASP, howstuffworks.com, Jul. 1, 2004.
User's Guide to Gator eWallet Version 7.x, published by Gain Publishing (no publication date known).
Using MS Message Queue Triggers, Bradley Holland, consulting.dthomas.co.uk, date unknown.
Mguill, "Genesis 2000 TechNet" Internet Publication, (Online) Jan. 28, 2003. Retrieved from the Internet: URL:http://www.genesis2000.com/support/index3.asp.
Calyx Point—Getting Started (Updated Aug. 2002).
Gator eWallet—The Smart Online Companion, Feb. 24, 2006 (2 pages). Retrieved from the Internet: URL:http://www.gator.com/home2.html.
Gator eWallet—Frequently Asked Questions, Feb. 24, 2006 (11 pages). Retrieved from the Internet: URL:http://www.gator.com/help/gatorfaq.html.
Point Installation (PN 801000-000737) (2 pages).
Byte User Guide. Version 4.8, CBC Companies: Nov. 2003.
"IFAP—Dear Partner, Colleague Letters," [online] [Retrieved on Jul. 23, 2013]; Retrieved from the Internet URL: http://www.ifap.ed.gov/dpcletters/doc0350_bodyoftext.htm; 3 pages.
"Ellie Mae Breaks Ground with Dynamic Loan Screening, the Industry's First Loan Matching System," [online] [Retrieved on Jul. 23, 2013]; Retrieved from the Internet URL: http://www.elliemae.com/ellie-mae-breaks-ground-with-dynamic-loan-screening-the-industrys-first-loan-matching-system/; 5 pages.

\* cited by examiner

700

ADD/EDIT/VIEW USER

USER ID  — 702

DISABLE ACCOUNT

PASSWORD  — 704    RE-TYPE PASSWORD

FIRST NAME  — 706    LAST NAME

PERSONA  — 708    PHONE NUMBER

EMAIL

GROUP  — 709

THE USER CAN ACCESS:  — 710    WORKING FOLDER
- ☐ REPORTS    DEMO
- ☑ FILE TRANSFER
- ☐ TEMPLATES AND TABLES    ── ACCESS TO SUB LOANS ──
- ☐ TRACKING SETUP    ○ READ/WRITE RIGHT
- ☐ UPLOAD/DOWNLOAD    ⦿ READ-ONLY RIGHT
- ☑ INDIVIDUAL MY ePASS ACCOUNT

712

[ OK ]  [ CANCEL ]

FIG. 7

ENTERPRISE SECURITY MANAGEMENT SYSTEM USING HIERARCHICAL ORGANIZATION AND MULTIPLE OWNERSHIP STRUCTURE

CROSS-REFERENCE TO RELATED APPLICATIONS

This application is a continuation application of, and claims priority to, pending U.S. patent application Ser. No. 10/991,829, filed on Nov. 18, 2004, entitled "Enterprise Security Management System Using Hierarchical Organization and Multiple Ownership Structure", which is a continuation-in-part of U.S. patent application Ser. No. 10/884,766, filed on Jul. 2, 2004, entitled "Loan Origination Software System for Processing Mortgage Loans Over a Distributed Network". The application herein claims the benefit of priority of all of the above listed patent applications and hereby incorporates by reference in their entirety the said patent applications.

FIELD OF THE INVENTION

The present invention relates generally to computer networks and enterprise organization, and more specifically, to a system for organizing users within an enterprise based on hierarchical relationships to control data integrity and access to shared network resources.

BACKGROUND OF THE INVENTION

The present invention relates generally to computer networks and enterprise organization, and more specifically, to a system for organizing users within an enterprise based on hierarchical relationships to control data integrity and access to shared network resources.

In most types of enterprises or organizations, the powers, privileges, and lines of communication of the members are dictated by their roles, functions, and seniority within the organization. In complex organizations with several different member groups and hierarchical structures, grants of authority, communication among members and access to enterprise data and other resources must be carefully controlled in order to maintain security within the organization and the integrity of the shared resources.

Most modern enterprises and organizations use some sort of computer network to conduct their activity or business. Typically, each user or group of users will have access to a computer that is coupled to one or more other computers within the organization or outside resources used or served by the organization. Most computer operating systems allow users to be organized in some sort of grouping structure within the organization. However the hierarchical structures that can be defined are often very limited and typically do not allow for flexible and secure use of resources within the organization.

FIG. 1 illustrates the organization of computer users in a present known operating system that exemplifies a flat organizational structure in which a number of networked computer users 104 denoted U1, U2, to $U_N$, are represented in terms of their logical relationships to one another. Each user typically operates a computer or workstation and has access and controls over certain resources, such as files and devices (printers, monitors, computer-controlled machines, data communication devices, and so on). The users are controlled or managed by an administrator or "root" user 102. The users 104 may be organized into groups, such as group 1 and group 2. Some users may belong to more than one group or to no group at all. The organization of users into groups allows the administrator to efficiently define restrictions or privileges of the users depending on group definitions.

For the structure illustrated in FIG. 1, access and communication among users is strictly limited by the one-dimensional hierarchy established by the system. Only the administrator 102 has full access to the resources owned or controlled by each user, and no one user has access to the resources or files of any other user. This structure limits the flow of data and access to resources due to the fact ownership of files and resources is strictly defined. The security system in such a network typically comprises defining a user identifier (user name or "userID") and password for each user. A group affiliation may also be specified. Such a system may provide limited security for files and resources controlled by a specific user, but it does not allow for efficient sharing of resources among other users without compromising the security of the data or resources.

What is needed therefore, is an organizational model for networked computer users that allows for multiple ownership of system files and resources while maintaining rigid security rules over the users. Such a model is especially useful in industries in which a common body of data is operated on by a number of different users, such as networked financial enterprises, and more specifically, the mortgage loan industry. This industry requires the interfacing of various different parties including borrowers, banks, brokers, and third party service providers. Throughout the loan submission and approval process, a core set of data, the borrower's loan application data, is examined and manipulated by various different people, with each one performing a different task. The advent of on-line services, and especially web-based systems, has led to the development of sophisticated programs, referred to as Loan Origination Software (LOS) systems, which are used by loan brokers to automate the loan application process and fulfillment process.

In a traditional loan application scenario, a borrower may use a loan broker to find a loan. The broker takes the application information from the borrower and compiles the customary loan application papers. The loan origination process typically involves many different processing steps that are very detailed and data-specific, including pre-qualifying the borrower, generating loan documents, finding a lender, originating the loan, generating disclosure documents and reports, processing the loan and tracking the loan application through the final stages of underwriting and fulfillment. Various different people within the loan brokerage can be involved in each loan application, such as the loan officer who finds the appropriate loan for the borrower, the loan processor who coordinates the construction and finalization of the loan documents, and the manager who oversees the brokerage business. These parties closely interact with each other over the course of a loan application process. Each party also interacts with various outside parties, such as banks, financial institutions, underwriters, government sponsored entities, and various third party service providers and settlement service vendors.

Although present LOS systems allow brokers to automate certain processes, such as producing and populating loan forms, and keeping track of an applicant's financial information, typical loan origination software systems do not provide a comprehensive interface and access to system resources among loan officers and the other parties involved in the loan origination process, such as the loan processor and brokerage manager. Entities within the mortgage loan industry may be organized in terms of headquarters, branch offices, and individual users like brokers, loan officers, and processors. An executive in a company may want to review and manage the overall operation and loan processing status from the corporate point of view. Likewise, a broker in a branch office may want to review and manage the operation and processing status for the branch. Each of these users needs access to files and data that are controlled by other members of the organization.

What is further needed, therefore, is an organizational model that implements a hierarchical security system that allows for multiple ownership and access to files in a loan origination software system.

SUMMARY OF THE INVENTION

A hierarchical security model for networked computer users is described. Files and resources are created and controlled by users within the network. Each user within the network has an account that is managed by a network administrator. The account specifies the user identifier and password. Users are grouped into organizations depending upon function or other organizational parameter. The groups within the network are organized hierarchically in terms of access and control privileges. Users within a higher level group may exercise access and control privileges over files or resources owned by users in a lower level group. The account for each user further specifies the group that the owner belongs to and an identifier for any higher level groups that have access privileges over the user's group. All users within a group inherit the rights and restrictions of the group.

The hierarchical organization and security model may be implemented in a loan origination and processing system in which a server computer is coupled to a brokerage network comprising a loan officer client, a loan processor client, and a broker manager client. A common data store for loan and customer data is centrally stored within the network. Each user within the network has unique access and display privileges with respect to the data stored in the data store. Different users may be assigned personas corresponding to their roles within the organization, such as managers, loan brokers, loan officers and loan processors. The users can be grouped into organizations depending upon specific roles or functionality within the network, geographic characteristics, or similar type of organizational parameter. The user groups are organized into a hierarchical relationship depending upon the organizational parameter. This hierarchy dictates the access and control privileges among the groups within the system.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIG. 7 is an exemplary screen shot for a page allowing for the addition, editing, or viewing of a user in the setup page of FIG. 5.

DETAILED DESCRIPTION OF THE PREFERRED EMBODIMENT

Figure 1:
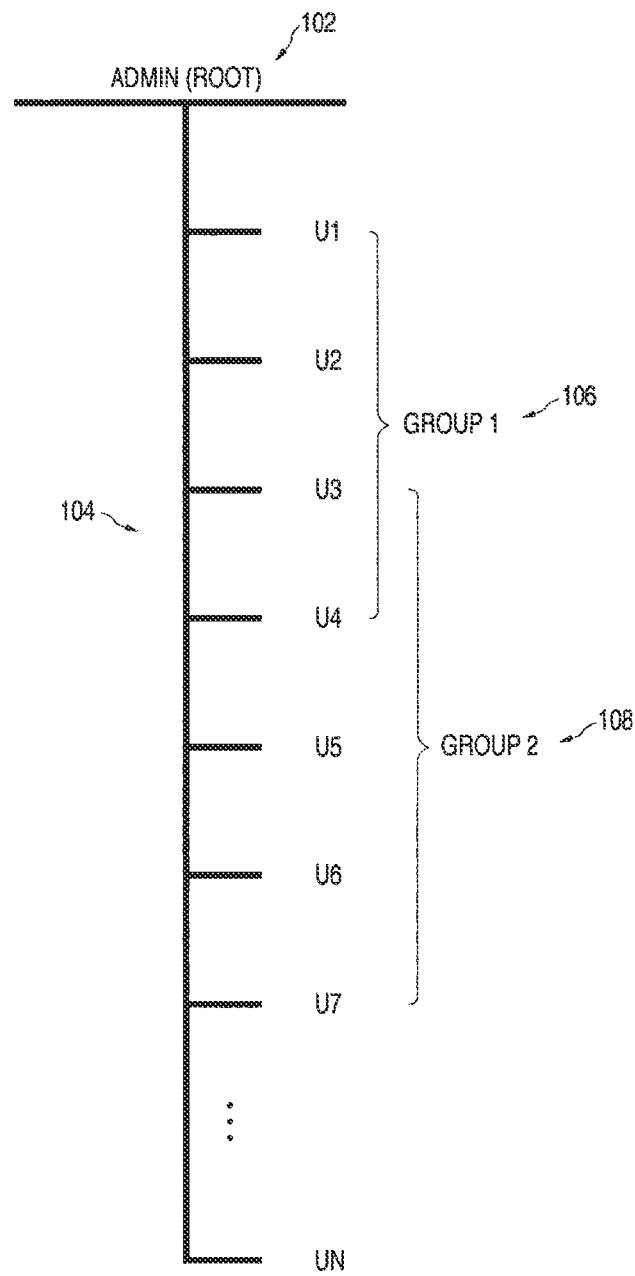
FIG. 1 illustrates a known organizational structure for networked computer users.

A hierarchical security organization for a computer network is disclosed. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers to executing software instructions. According to one embodiment of the present invention, server and client computer systems transmit and receive data over a computer network or a fiber or copper-based telecommunications network. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers. In some instances, the client and server functionality may be implemented on a single computer platform.

Aspects of the present invention can be used in a distributed electronic commerce application that includes a client/server network system that links one or more server computers to one or more client computers, as well as server computers to other server computers and client computers to other client computers. The client and server computers may be implemented as desktop personal computers, workstation computers, mobile computers, portable computing devices, personal digital assistant (PDA) devices, or any other similar type of computing device.

Figure 2:
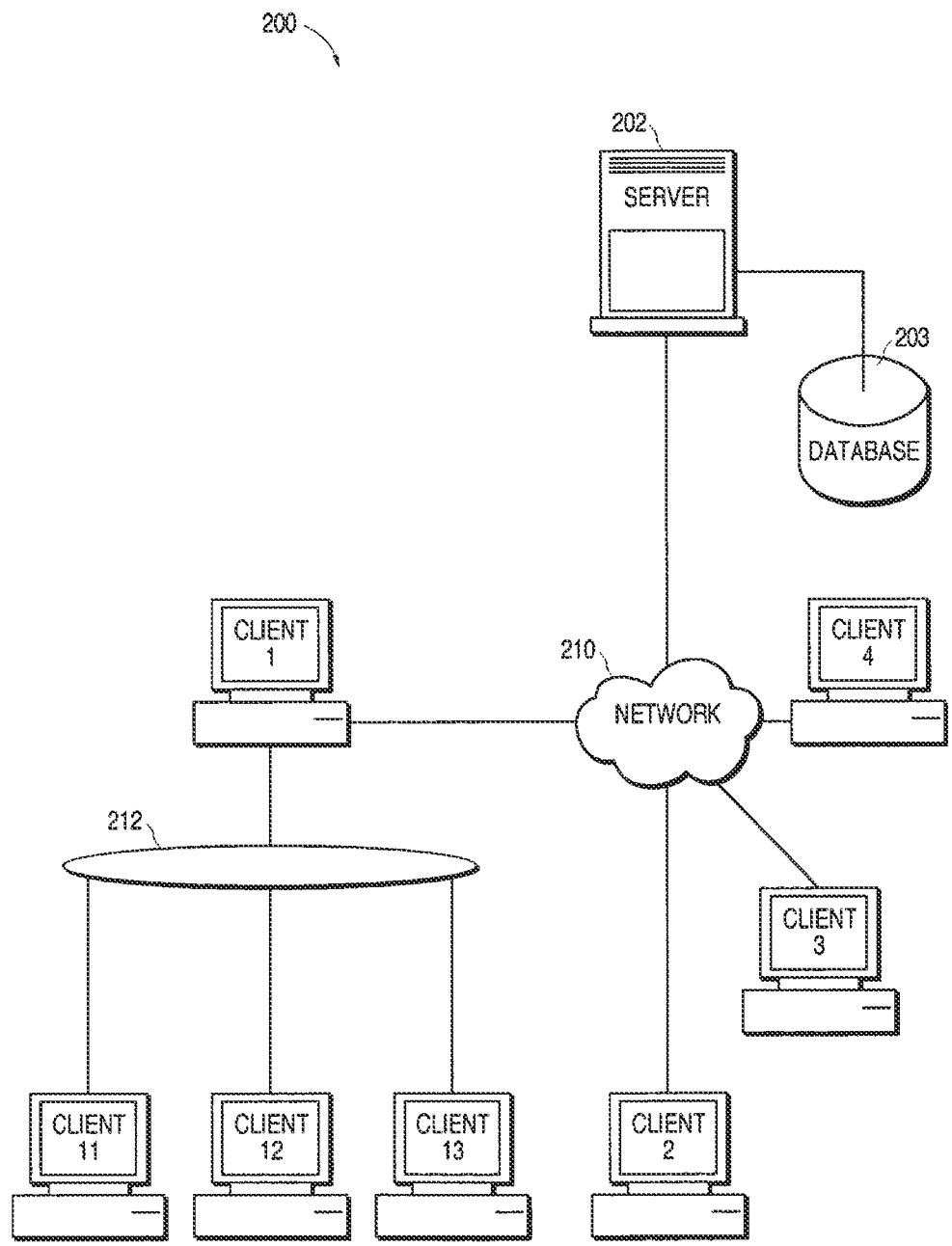
FIG. 2 illustrates a network that implements a hierarchical security organization, according to embodiments of the present invention.

FIG. 2 illustrates an overall computing environment 200 that can be used to implement embodiments of the present application. In network 200 a server computer 202 is coupled to one or more client computers over a network 210. Depending upon the network topography of network 210, the client computers may be linked to all of the other computers in the network, or they may be linked to only a subset of the other networked computers. Furthermore, some of the client computers may be coupled to other computers over a separate or private network. Thus, as illustrated in FIG. 2, client computers 2, 3, and 4 are linked to network 210 directly, and client 1 is coupled to network 210 as well as client computers 11, 12, and 13 over a subnetwork 212.

The network 210 coupling the network clients to network server 202 may be a private network (e.g., LAN), a corporate network, such as an intranet, or a large-scale network, such as the Internet. The network 200 illustrated in FIG. 2 represents the physical layout of the computers in a network. The logical or functional relationships among the computer users is established by the network rules that are defined to govern the hierarchy within the network and the restrictions and privileges of the client computer users in relation to one another.

Each computer within system 200 typically maintains local resources, such as devices like monitors, printers, disk drives and so on. In addition, each user creates, manages, or otherwise manipulates files and documents and stores these documents on local or remotely coupled storage devices, such as data storage device 203 coupled to server 202. In general, each user who creates a file or has a local resource coupled to his or her computer "owns" that file or resource. Ownership of a file or document allows a user to exercise exclusive control over the access and distribution of that file or resource. Such files and resources are typically restricted so that only the owner and any authorized user may access that file or resource.

In one embodiment, the server 202 maintains a database that stores the status of each of the computers coupled to the network 210. Each user in system 200 is identified by a unique user identifier (userID) and password. This ensures that a particular computer within the system, and its files and resources can be accessed only by the appropriate user. Each user has an account with the network and only valid, recognized users are allowed to access the network. The administrator or server computer user typically executes a management program that monitors each user's account.

The client computers within system 200 are further organized into logical groups. A group can consist of one or more computers that are defined in a hierarchical relationship with respect to the other computers in the network. The relationship among the groups in the system can be defined by the functionality of the users within that group relative to the rest of the organization, or by seniority of the users, or some other parameter that establishes a control model within the organization. The hierarchical structure imposes logical relationships among the users to allow access and control of files and resources owned by lower level (subordinate) users by higher level users, referred to as "parents" or superiors. Higher level parent groups of a lower level group are referred to as "ancestor" groups. Such a logical network topology can be represented as a tree-structure that illustrates the users as nodes connected by logical control links.

Figure 3:
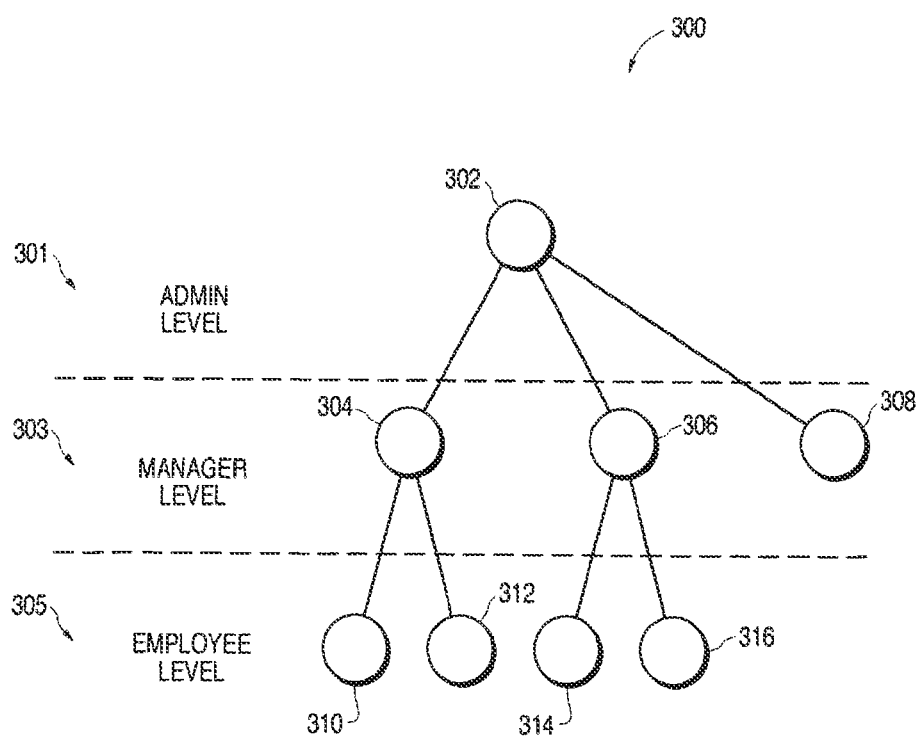
FIG. 3 illustrates an exemplary organizational structure for representing hierarchical relationships among networked computer users, according to one embodiment of the present invention.

FIG. 3 illustrates an exemplary organizational structure for representing hierarchical relationships among networked computer users, according to one embodiment of the present invention. Each node in FIG. 3 may represent a single computer user or a group of computer users. For the purposes of the following discussion, the terms "group" or "organization" refer to a user or users represented by a node shown in FIG. 3. All of the users within a group have the same restrictions and privileges. For the embodiment illustrated in system 300, group 302 (typically a single user or workstation) functions as a network administrator to define and manage the logical relationship among the users of the networked client computers. The administrator has access and control privileges over all of the lower level groups within the network. Thus, in system 300, lower level groups 304, 306, and 308, are directly accessible from the administrator 302. These lower level groups can have access and control privileges over other subordinate groups, in turn. For example, as shown in FIG. 3, group 304 has access rights to groups 310 and 312, and group 306 has access rights to groups 314 and 316. Each higher level group has access to and control over the resources and files owned or controlled by its subordinate groups. Thus, groups 302 and 304 have control over the files and resources of group 310, but only group 302 has control over the files and resources of computer 304.

In one embodiment of the present invention, the groups can be organized into different levels. Each level may encompass groups who have the same or similar hierarchical status. As illustrated in FIG. 3, the lowest level of groups may comprise the employee level 305, with the higher level groups in the manager level 303, and the administrator 302 in the administration level 301.

The links between the different levels of groups strictly defines the access rights and privileges of the higher level groups with respect to the lower level groups. Thus, the files and resources of group 314 can only be accessed by group 306, but not groups 304 or 308 even though both of these groups are also manager level groups. In general each group (node) in the logical organizational tree can only have one parent group, but each group can have one or more child groups. If a file is co-owned by two users in two different groups then the file accessible by those two users and the users in any of their ancestor groups.

For the embodiment of system 300, the lines of control represented by the links between the nodes is unidirectional. That is, access and control flows only from the higher level groups to the lower level groups. Communication among any pair of groups in the system is possible as long as there is a logical and physical link between the groups. However, control of resources owned by a specific group is strictly governed by the logical links defined among the groups and is restricted to only the higher level groups that have a logical link to the lower level group.

In one embodiment of the present invention, the hierarchical structure of the system is maintained through the use of tables that list the user accounts and the relationships between the users and groups, and the hierarchy among the groups. The organization and storage of this data depends upon system resources and specific implementation details. For example, all of the information related to the system organization can be stored in a single table that lists the identifiers and relationships for all of the users and systems. In a preferred embodiment, however, one table is maintained for the system users, and a separate table is maintained for the groups.

Figure 4A:
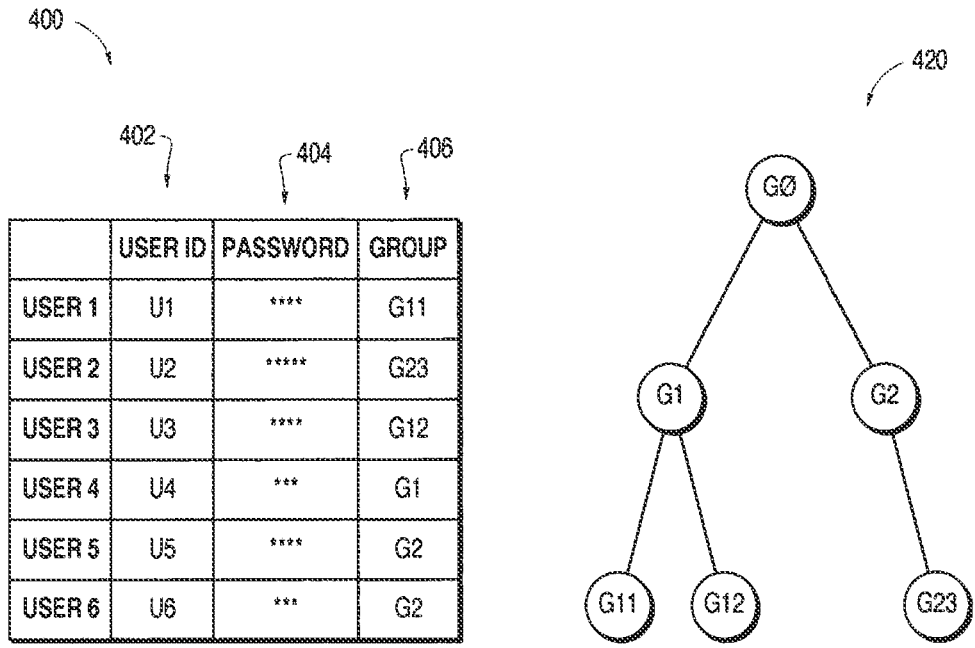
FIG. 4A illustrates an example of a user table storing user descriptors for use in a network, according to one embodiment of the present invention.

Each user in the network has a controlled account that specifies the user identifier associated with the networked computer as well as a unique password or security key that provides user validation. This information comprises a user descriptor for each particular user. In one embodiment the user descriptor further includes a group identifier that specifies the group to which the user belongs. FIG. 4A illustrates the composition of a user descriptor for use in a network, according to one embodiment of the present invention. The user descriptor consists of the userID, password, group identifier, and as an option, the parent group identifier for each user in the network. Table 400 is an exemplary table of descriptors for six different users in a network. Each user (Users 1-6) has a userID 402 and unique password 404. If the user belongs to a group, the groupID 406 is also defined. If the user constitutes a group of one, the groupID may be the same as the userID.

The relationship among the groups within the system can be specified and stored in a group table that is separate from the user table, for embodiments in which the parent group information is not provided in the user table. FIG. 4B illustrates an example of a group table, according to one embodiment of the present invention. The groups listed in exemplary table 410 correspond to the user groups identified in table 400. The group descriptor for each group consists of a groupID 412, a short text description of the group 414, and the groupID of the parent group 416. The specification of a parent group in the descriptor for each group defines the hierarchy among the groups, and therefore among the users within these groups. The group table can also include a list of the child groups for each parent group. However, such a listing can become quite large if each group has a high number of child nodes. Furthermore, only the parent group for each group needs to be identified in order to establish the hierarchy of the system.

In an alternative embodiment, the hierarchical relationships established between pairs of groups in the system can be defined by including in the user descriptor the group identifier of a parent group for the user's group, or the userID for a parent user. In this embodiment, a separate group table need not be maintained since the user table 400 includes the parent groupID for each user's group. This however, may lead to the creation and storage of redundant data since a group with many users would list the same parent group for each user. In certain cases, therefore, it is more efficient to maintain a separate table for the users and the groups.

Figure 4C:
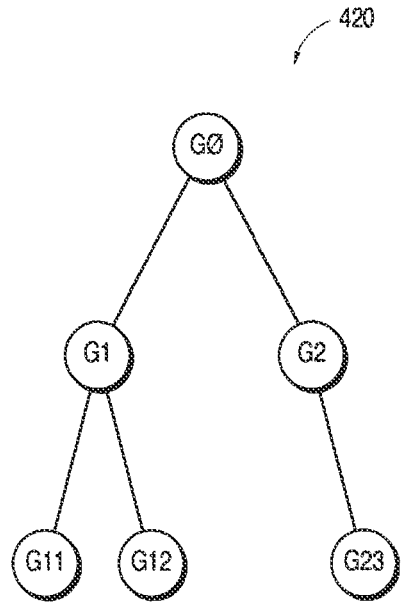
FIG. 4C illustrates the hierarchical relationship of the groups represented in FIG. 4B.
Figure 4B:
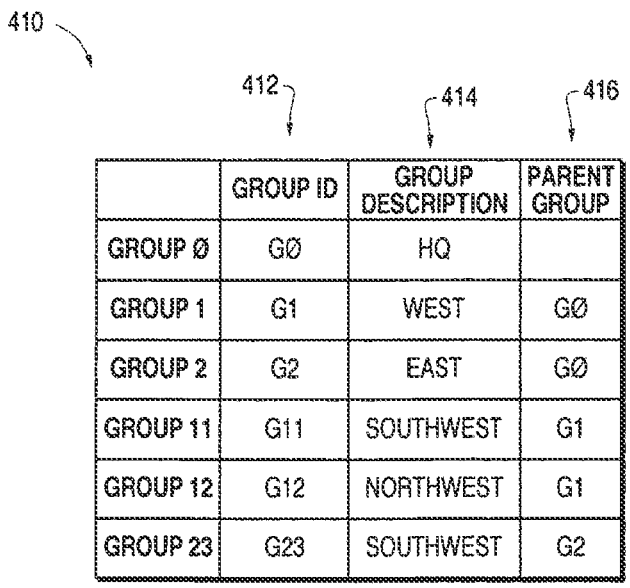
FIG. 4B illustrates an example of a group table storing group descriptors, according to one embodiment of the present invention.

FIG. 4C is a tree-diagram that illustrates the hierarchical relationships of the users and groups represented in FIGS. 4A and 4B. For example, as shown in system 420, user 1 is in group G11, which has a logical link to its parent group G1. Likewise, user 4 is in group G1, which has a logical link to its parent group, group G0.

In one embodiment, the table or tables listing the user account information, including each unique user descriptor, and the group hierarchy information is stored in a database accessible to the administrator user. The files used by the users may also be entirely stored in a data storage device tightly coupled to the administrator computer, such as data storage 203 in FIG. 2, or they may be stored in data storage devices coupled to the individual user computers. The administrator user operates an administration tool that manages the network definitions and relationships for each of the users in the network. All users associated with a group inherit the restrictions, privileges and control characteristics associated with that group.

The restrictions and privileges assigned to users and groups within the network define how objects created, revised, used, or otherwise manipulated by each user can be accessed and manipulated by other users in the system. A number of different types of objects can be controlled by the hierarchical structure. These include data files, local devices, or other similar objects or resources. Typically the user who creates a file and stores it in a local or network data storage has ownership rights to that file. Ownership allows the owner to delete, modify, transmit, or otherwise manipulate the file or even assign ownership to another user. Similarly, resources, such as devices that are installed within the user's computer or are defined for the user can constitute resources that are owned by the user.

In the case of data files or database records, in one embodiment of the present invention, a label is associated with each such file or record. The label includes information that identifies the owner of the file (by userID) and perhaps also the storage location of the file (e.g., pathname). The label can, but does not necessarily need to include information that identifies higher level users that have access privileges to the document, since the higher level group information can be derived from the group table, such as that illustrated in FIG. 4B. The revision history of each document or object within the system can be stored so that a file or object that is missing a label can have the document back-traced to the owner and the label can then be applied to the document or file.

The hierarchical model based on the access privileges of higher level users and lower level users allows for the effective co-ownership or multiple ownership of files and resources within the system. A higher level user can access and manipulate the files and resources owned by the lower level users for which his or her group is an ancestor group of the lower level user's group. This mechanism allows for the implementation of role-based security measures based on the organizational hierarchy. It also allows for the establishment of a collaboration mechanism for multiple users.

In one embodiment of the present invention, users within the different groups may be assigned specific roles or types of roles, referred to as a "persona." The different types of personas that may be defined depend on the network environment, application software environment, or industry enterprise. Any user in any group can have a unique persona. The use of personas can facilitate restrictions or privileges associated with each user that is separate from the hierarchical organization. Thus, regardless of group affiliation, people with a particular persona may be restricted from viewing or modifying certain documents within a system. For example, in the mortgage loan industry, users that have the persona of loan officer may have access to reports that list statistics related to each office, whereas users that are categorized as loan officers or loan processors may not have this privilege.

In one embodiment of the present application, the hierarchical organization model described herein is utilized in the online mortgage loan industry and constitutes an aspect or feature of the loan origination software system that is described in co-pending and co-assigned U.S. patent application Ser. No. 10/884,766, filed Jul. 2, 2004, entitled "Loan Origination Software System for Processing Mortgage Loans Over a Distributed Network," which is incorporated by reference herein in its entirety.

In the loan application process, a broker matches a borrower with the loan package that best suits their need. The broker obtains data from the borrower and then shops for loans from the available sources in the wholesale loan market. Loan brokers typically execute Loan Origination Software (LOS) programs to manage the origination tasks in the loan application process for a borrower. The mortgage application is typically processed by teams of people who fulfill separate sales (loan officer), processing (loan processor), and management (brokerage manager) functions.

In one embodiment, data relating to the borrower is stored in a secure centralized database. The processing and management system includes separate graphical user interfaces that provide each member of a brokerage company, i.e., loan officer, processor, and manager, with a unique view of loan data, tailored to their role in the loan origination process and personalized to fit their needs. The single data source, allows for automatic population of loan application forms with current loan information throughout the system, and ensures that each of the parties has access to and works on the latest and most complete version of the loan application. Furthermore, the maintenance of only one true version of every loan in the system facilitates the automation of various functions, such as accurate loan pipeline displays, automated loan tracking with milestones and alert generation, up-to-date contact management, conflict-free inter-party communication and conversation logging, and accurate company-wide business metrics.

The entities within the mortgage loan system may be organized in various different ways, but typically comprise a main office (headquarters), one or more regional (branch) offices operated by loan brokers, which control the loan officers and processors in that region. The files constituting the active loans for each customer of the company or brokerage are typically stored in a central computer administered by the headquarter office.

Figure 5:
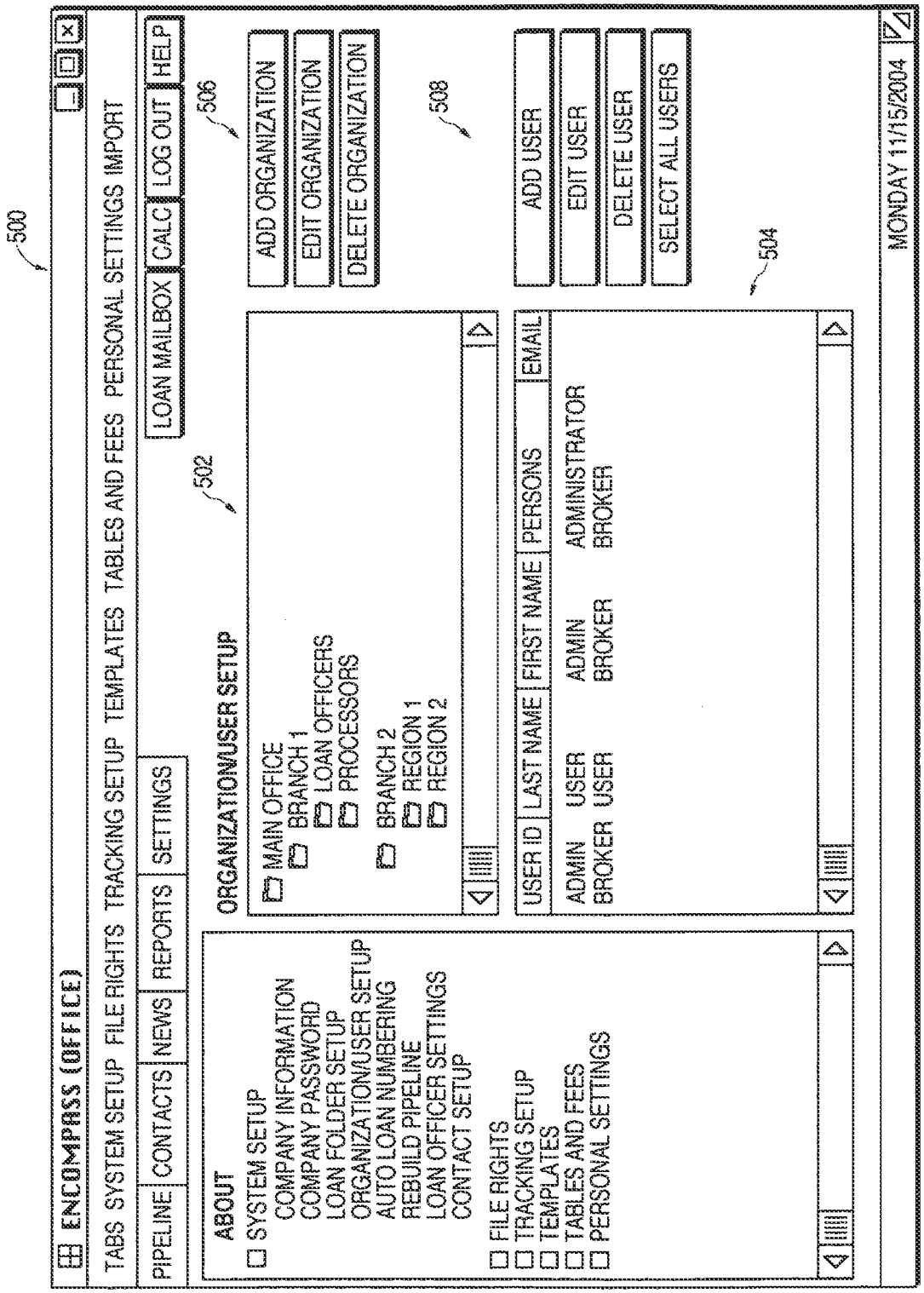
FIG. 5 is an exemplary screen shot of an organization setup page, according to one embodiment of the present invention.

FIG. 5 is an exemplary screen shot of an organization setup page, according to an embodiment of the present invention in which the system is implemented in a loan origination software system for processing mortgage loans, such as that described in U.S. patent application Ser. No. 10/884,766. The organization setup page 500 is available through an admin tool provided by the network management software program executed by the administrator of the network. The organization setup page allows the administrator to add, delete, modify, or otherwise define the hierarchical relationships among the users and groups in the network. It is assumed that each user that is defined in the setup program operates a computer that is physically coupled to the network. The setup screen 500 illustrated in FIG. 5 includes main window 502 that displays the groups or organizations within the network and the hierarchical structure for these groups. For the example illustrated in FIG. 5, the administration or root user is denoted as the main office. There are two main lower level groups denoted Branch 1 and Branch 2. Under Branch 1 are two additional lower level groups denoted Loan Officers and Processors. For Branch 2, there are two additional lower level groups denoted Region 1 and Region 2. Option buttons 506 allow the administrator to add, edit, or delete organizations from the hierarchical organization.

Each group or organization shown in the setup window 502 comprises any number of individual users. Display window 504 displays the identifying information for each user in the selected group. This information includes the userID, full name of the user, the persona of the user (if any is assigned), and contact information for the user. Option buttons 508 allow the administrator to add, edit, or delete users from the groups.

Figure 6:
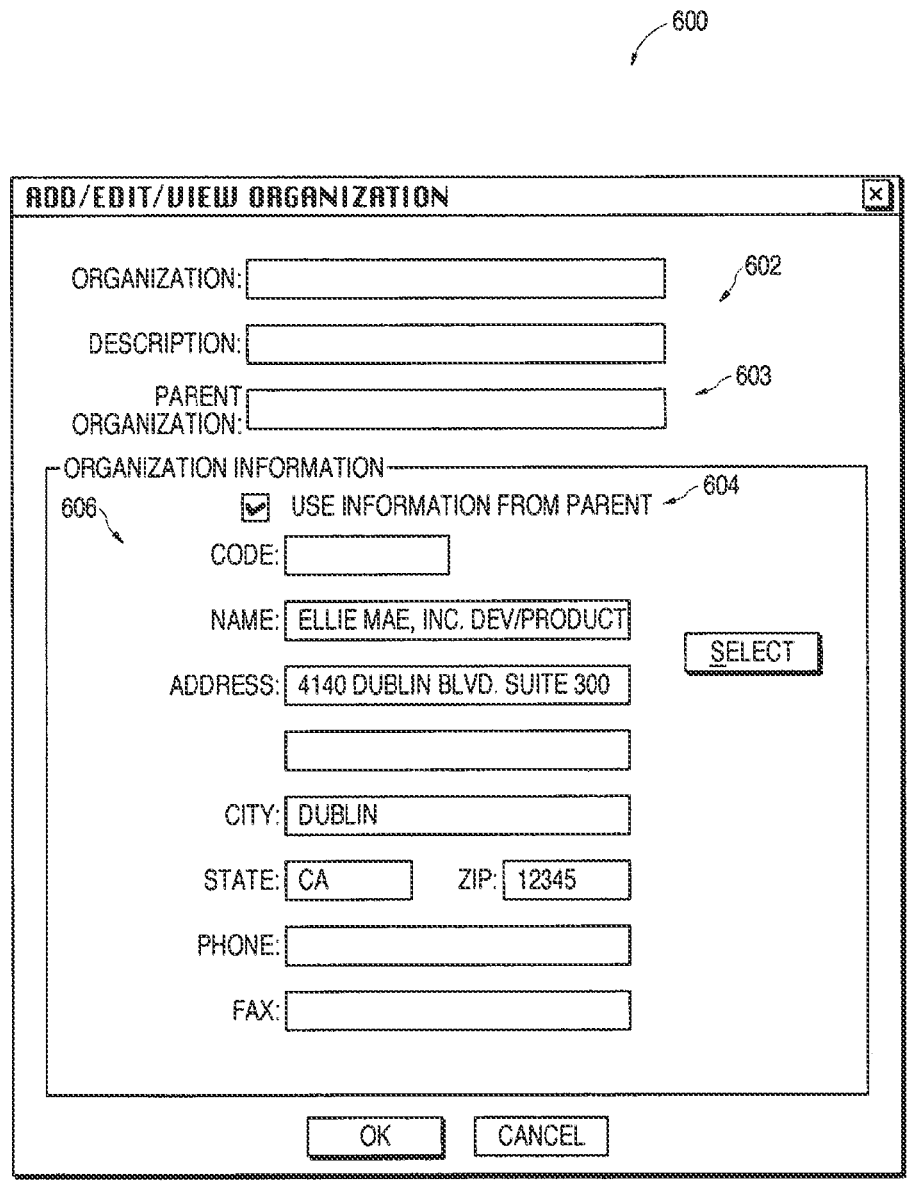
FIG. 6 is an exemplary screen shot for a page allowing for the addition, editing, or viewing of an organization in the setup page of FIG. 5.

FIG. 6 is an exemplary screen shot for a page that allows the addition, editing, or viewing of an organization in the setup page of FIG. 5. This screen can be accessed by selecting one of the option buttons 506 in setup screen 500. In the edit organization screen 600, the administrator can input various items of information related to the organization, including the name and description of the organization 602, and the address/contact information 606 for the organization. If the group or organization is a lower level group that has a parent group, the information for the group can be imported from the parent group by selecting command option 604.

FIG. 7 is an exemplary screen shot for a page that allows the addition, editing, or viewing of a user in the setup page of FIG. 5. This screen can be accessed by selecting one of the option buttons 508 in setup screen 500. The user edit screen 700 includes several input fields that allows the administrator to specify the userID 702, password 704, name 706, and persona 708 of the user. The privileges and restrictions for the user are defined in option field 710. These options allow the administrator to specify the kind of resources that the user is able to access, such as reports, files, templates, and so on. If the user has subordinate users or groups, access to the resources owned by these subordinate users can be restricted through the use of option buttons 712. Thus, the administrator can restrict a user to only being able to read a subordinate user's files, or the user can be granted read/write privileges for these files.

In one embodiment of the present invention, the hierarchical relationship among the groups and organizations is automatically defined when a group is added to the structure shown in display area 502. The setup screen 500 contains graphical user interface tools that allow the user to graphically or textually add a group (or "organization") to the hierarchical chart. Placing an icon representing a lower level group within a folder representing the parent group automatically establishes the hierarchy between the parent and lower level group. The link between these two groups is then automatically defined and stored in the system organization database, such as in a group table as illustrated in FIG. 4B, by the administrator.

In an alternative embodiment of the present invention, the hierarchy can be established when a particular group is added. For this embodiment, the edit organization screen includes a field that allows the user to specify the ID of the parent group or organization. This is illustrated in FIG. 6 as "parent organization" field 603. When the parent groupID is specified, the link between the two groups is stored in the system organization database by the administrator.

Likewise, the setup screen 500 contains graphical user interface tools that allow the user to graphically or textually add a user to the hierarchical chart. Opening a group in display window 502, and selecting the "add user" command automatically assigns the new user to this group. This group affiliation information is then defined and stored in the system organization database, such as in a user table as illustrated in FIG. 4A, by the administrator. Alternatively, however, the group affiliation for a user can be specified explicitly in the add/edit/view user screen 700. This is illustrated in FIG. 7 as "Group" field 709. When the groupID or group description is specified, the user is assigned to be a member of this group, and this affiliation is stored in the system organization database by the administrator.

Loan Origination Software System

As illustrated in FIGS. 5, 6, and 7, embodiments of the present invention may be used in a network that executes a loan origination software (LOS) program for use in the mortgage loan industry. In such a system, the LOS program and centralized database functions executed and maintained on a dedicated server computer that is coupled to one or more computers operated by the loan broker. The various users of the system are organized into groups or organizations based on function, location, or other feature, and access/control over system resources is dictated by this organizational hierarchy.

Figure 8:
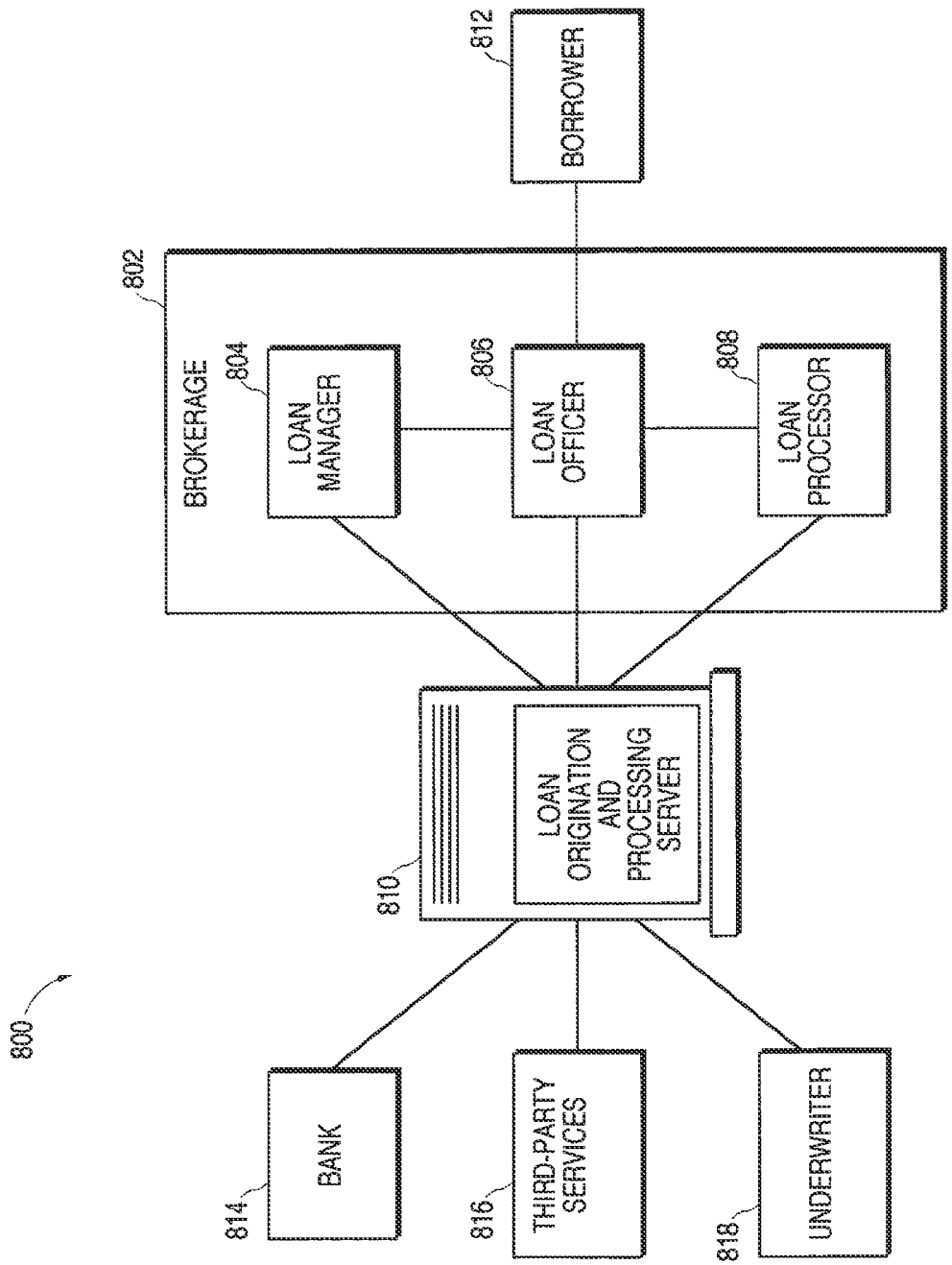
FIG. 8 illustrates an exemplary loan origination software system for processing loan applications that can be configured to implement embodiments of the present invention.

FIG. 8 illustrates an exemplary loan origination software system for processing loan applications that can be configured to implement embodiments of the present invention. In system 800, a loan origination and processing server 810 executes an LOS program and maintains a database that stores relevant borrower data, and other data, such as application form templates, government regulation information, lender information, and other mortgage or general loan-related information. The LOS program computer comprises several program modules that manage the loan origination process.

As illustrated in FIG. 8, the server computer 810 executes an LOS program. In an alternative embodiment, each of the loan origination and processing clients 804, 806, and 808 can execute respective LOS programs or portions of an LOS program. The loan origination and processing server 810 maintains a database that stores relevant borrower data, as well as other data pertinent to the loan application process. In this embodiment, the each of the different client entities 804, 806, and 808 within brokerage 802 can execute standalone LOS programs, or different instances (user interface views) of the same or a distributed LOS program. In a further alternative embodiment of the present invention, the loan origination and processing functionality performed by server 810 can be merged into each LOS client 804, 806, and 808. In this case, the maintenance of the database and other data can be performed by any of the LOS clients in the peer-to-peer networking model.

The loan origination and processing server 810 is coupled to a loan broker 802. The loan broker 802 consists of three different functional entities, the brokerage manager 804, loan officer 806, and loan processor 808. Each functional block in system 800 is intended to represent a networked computer that is operated by a respective operator. The loan officer 806 is the primary functional interface with borrowers, such as borrower 812, and some third party services 816. The loan processor 808 provides the main functional interface to loan underwriter 818, and other entities such as financial institution or bank (lender) 814, and many third-party services 816.

The loan officer 806 and processor 808 generally perform the function of initiating, fulfilling and settling the loan application. For example, the loan underwriter 818 reviews the loan application and approves or denies the application. One example of a mortgage loan underwriter is the Fannie Mae® company, which does not itself provide loan funds but works with lenders to assure that the funds are available. Lenders 814 are banks, savings and loans, or other financial institutions that provide the loan funds. The settlement service vendors 816 provide services and information required to close the loan. Such vendors include appraisers, credit reporting agencies, document preparers, flood certification agencies, and the like. Other third party entities that may be interfaced to the broker computer may include loan servicers who collect monthly payments from the borrower, and other similar loan process companies.

System 800 includes a network interface that provides access between the loan origination and processing server 810 and other entities. For this embodiment, as illustrated in FIG. 8, the bank 814, third party services 816, and underwriter 818 are coupled to the loan origination and processing server 810. The server 810 then provides the communication link between these entities and the various parties within the loan brokerage 802. In a typical implementation, the network coupling the various computers comprises the Internet, and the interface for each user may be a web-based interface. In this case, each functional block executes a web browser client process.

The client computers within broker 802 can be networked computers coupled together over a LAN, WAN, or similar network system, or they can be connected through the Internet. Furthermore, one or more of the computers can be remote or mobile devices that are only periodically coupled to the brokerage network.

The processing system 800 includes modules that serve to download map files from server 810 to broker client 802, present a loan selection panel (pipeline), and perform the form population of the loan applications on demand. The processing system 800 also allows for downloading of program modules to complete a transaction. For example, a DLL (Data Link Layer) object for a particular credit vendor can be downloaded to the user on request. Other tasks performed by module include performing client-side posts (e.g., HTTPS Post) to submit files to servers, receiving credit reports, presenting a message list for incoming server messages, and centrally tracking transactions on a server.

The processing system illustrated in system 800 can use the Secure Sockets Layer (SSL) protocol when transmitting data between clients and server 810. The transfer of data between clients and server is based on an open and expandable file format with no restriction or limitation on the type or amount of data. The client-side of the processing system 800 can be implemented through a web browser over an Internet link.

As illustrated in FIG. 8, the loan origination software system is provided in a central server computer, and the data relating to the borrower is stored in a centralized database. The broker 802 interfaces to the loan origination and processing server 802 through separate physical interfaces for each of the main entities within the brokerage. The processing and management system also includes separate graphical user interfaces that provide each of the loan officer, processor, and manager, with a unique view of loan data, tailored to their role in the loan origination process.

As described previously, each user in the system 800 has an account that is maintained by the system administrator and the different users within the system can be organized into groups with different hierarchical relationships. Such groups can comprise different regional offices of brokerage firms or a layered structure based strictly on roles within the mortgage company. Regardless of physical layout and organization, the establishment of a hierarchical relationship among the user groups allows for parent groups to access and control files and resources that are owned or managed by lower level users. This hierarchy facilitates the implementation of security features and collaboration tools that allow the users to protect and share the data used within the system.

Although examples of specific embodiments of the present invention have been described primarily in relation to computer networks that execute a loan origination software program, it should be noted, other embodiments can be directed to network systems that implement many other types of distributed software programs. Furthermore, embodiments of the present invention may be applicable in other enterprise organizations. The features of the present invention are directed to defining a hierarchical organization among users within the network based on group affiliation wherein parent group users have access and control over documents and resources of subordinate users.

In the foregoing, a system has been described for defining a hierarchical organization for groups of users of networked computers. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising:
identifying an administrator that has access rights and permissions to all network resources in a set of network resources;
assigning a first set of identifiers to a first set of users;
grouping the first set of users into a plurality of groups;
creating a hierarchical structure for the groups including determining a hierarchical relationship among the groups and the administrator wherein access rights and permissions are established for each group and wherein parent groups inherit access rights and permissions for their respective child groups and wherein the hierarchical structure includes one or more lines that each represent a direct path of related groups to the administrator;
for each user in the first set, associating one or more network resources in the set of network resources with a respective user wherein the one or more network resources are not the same for any user in the first set of users;
assigning a second set of identifiers to one or more of the first set of users, the second set of identifiers associating a respective one of the first set of users with at least one of a second set of users wherein the at least one of the second set of users is granted permission to access the one or more network resources associated with the respective one of the first set of users, wherein the at least one of the second set of users is not the administrator and not a group associated with the respective one of the first set of users or a parent or child group associated with the respective one of the first set of users and wherein the assigning of the second set of identifiers enables sharing of ownership over a respective network resource with a user that is outside of a line in the hierarchy associated with the respective one of the first set of users;
receiving a request from a requestor among the second set of users to access a network resource associated with one of the first set of users;
determining whether the requestor has permission to access the network resource;
determining which privileges the requestor is given relative to the network resource including when or if the requestor has permission to access the network resource; and
providing the requestor with the network resource based on the determined privilege.

2. The method of claim 1, wherein assigning the first identifier includes associating the first set of users with a plurality of child groups, with at least two users in the first set of users being associated with a different child group.

3. The method of claim 2, wherein assigning the second identifier includes:
associating the second set of users with a plurality of parent groups; and
associating at least one of the first set of users in the plurality of child groups with at least one of the second set of users in the plurality of parent groups.

4. The method of claim 3, further comprising:
generating, based on the first identifier, a user descriptor table that specifies the association between each of the first set of users and a respective child group.

5. The method of claim 3, further comprising:
generating, based on the second identifier, a group descriptor table that specifies an association between the plurality of child groups and the plurality of parent groups.

6. The method of claim 5, further comprising:
determining access privilege of at least one of the second set of users with respect to one or more files based on the association specified on the group descriptor table.

7. The method of claim 1, wherein receiving the request includes receiving a request to access one or more data files.

8. The method of claim 1, wherein determining which privileges includes determining whether the requestor has read or write privilege.

9. The method of claim 1 wherein the network resources are associated with a loan origination software system and the shared network resources includes loan data for an individual, wherein the hierarchal structure is an organizational structure based on roles, departments, offices or other divisions and the second set of users are in a different role, department, office or other division in the hierarchical structure.

10. A method of organizing users in an enterprise, the method comprising:
assigning a user identifier and a password to an administrator for the enterprise;
assigning a user identifier and password to at least one user of a plurality of users;
assigning a group identifier to the at least one user for associating with a group;
specifying a parent group identifier for the group assigned to the at least one user, the parent group identifier identifying a parent group containing one or more superior users who have access to resources owned by the at least one user, wherein the one or more superior users are not the administrator and wherein the specifying the parent group identifier enables sharing of ownership over a respective network resource between users in a respective parent group and the at least one user;
assigning, by one or more processors, co-ownership to a resource to the at least one user with a second different user in the plurality of users, wherein the second different user is not the administrator or a user in the group or the parent group associated with the at least one user;
storing the user identifier, password, and group identifier for the plurality of users in a user descriptor table;
storing the group identifier and parent group identifier in a group descriptor table for associating a respective group with a respective parent group; and
establishing a hierarchical relationship among the respective group and respective parent group based on the group and parent group identifier.

11. The method of claim 10, further comprising defining access privileges for the one or more superior users over the resources owned by the user.

12. A system comprising:
a plurality of first devices; and
a server coupled with the plurality of first devices through a network, wherein the server includes one or more processors that are configured to:
identify an administrator that has access rights and permissions to all network resources in a set of network resources;
assign a first set of identifiers to the plurality of first devices;
grouping the first set of devices into a plurality of groups;
creating a hierarchical structure for the groups including determining a hierarchical relationship among the groups and the administrator wherein access rights and permissions are established for each group and wherein parent groups inherit access rights and permissions for their respective child groups and wherein the hierarchical structure includes one or more lines that each represent a direct path of related groups to the administrator;

for each of the first devices, associating one or more network resources in the set of network resources with a respective device wherein the one or more network resources are not the same for any device in the first plurality of devices;

assign, by the one or more processors, a second set of identifiers to one or more of the plurality of first devices, the second set of identifiers associating a respective one of the plurality of first devices with at least one of a plurality of second devices, wherein the at least one of the plurality of second devices is granted permission to access one or more network resources associated with the respective one of the plurality of first devices wherein the at least one of the second devices is not associated with the administrator and not in a group associated with the respective one of the first set of devices or a parent or child group associated with the respective one of the first set of devices and wherein the assigning of the second set of identifiers enables sharing of ownership over a respective network resource with a device that is outside of a line in the hierarchy associated with the respective one of the first set of devices;

receive a request from a requestor to access a network resource;

determine whether the requestor has permission to access the network resource;

determine which privileges the requestor is given relative to the network resource if the requestor has permission to access the network resource; and provide the requestor with the network resource based on the determined privilege.

13. The system of claim 12, wherein the server is configured to associate the plurality of first devices with a plurality of child groups, with at least two of the plurality of first devices being associated with a different child group.

14. The system of claim 13, wherein the server is configured to:
associate the plurality of second devices with a plurality of parent groups; and
associate at least one of the plurality of first devices in the plurality of child groups with at least one of the plurality of second devices in the plurality of parent groups.

15. The system of claim 14, wherein the server is configured to:
generate, based on the first identifier, a user descriptor table that specifies the association between each of the plurality of first devices and a respective child group.

16. The system of claim 14, wherein the server is configured to:
generate, based on the second identifier, a group descriptor table that specifies an association between the plurality of child groups and the plurality of parent groups.

17. The system of claim 16, wherein the server is configured to:
determine access privilege of at least one of the plurality of second devices with respect to one or more files based on the association specified on the group descriptor table.

18. The system of claim 12, wherein the server is configured to receive a request to access one or more data files.

19. The system of claim 12, wherein the server is configured to determine whether the requestor has read or write privilege.

* * * * *